(12) United States Patent
Miyake

(10) Patent No.: US 7,265,734 B2
(45) Date of Patent: Sep. 4, 2007

(54) DISPLAY APPARATUS AND ELECTRONIC WATCH USING THE DISPLAY APPARATUS

(75) Inventor: Takeshi Miyake, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 699 days.

(21) Appl. No.: 10/735,448

(22) Filed: Dec. 11, 2003

(65) Prior Publication Data

US 2004/0125311 A1    Jul. 1, 2004

(30) Foreign Application Priority Data

Dec. 27, 2002   (JP)   ............................. 2002-378790

(51) Int. Cl.
*G09G 3/00*   (2006.01)
(52) U.S. Cl. ...................... 345/30; 345/87; 345/89; 345/204; 362/108; 349/61
(58) Field of Classification Search .................. 345/30, 345/204, 87, 89; 362/108, 234; 349/61
See application file for complete search history.

(56) References Cited

U.S. PATENT DOCUMENTS 4,910,652 A  *  3/1990  Rhine .......................... 362/234
5,548,565 A  *  8/1996  Aoyama et al. ............. 368/227
6,017,127 A  *  1/2000  Kurple ........................ 362/29
6,806,644 B2 * 10/2004  Ueno et al. .................. 313/512
7,095,463 B2 *  8/2006  Usui et al. ..................... 349/61

FOREIGN PATENT DOCUMENTS

JP     57-101788 A    6/1982
JP     08-220263 A    8/1996

OTHER PUBLICATIONS

English abstract attached.

* cited by examiner

*Primary Examiner*—Richard Hjerpe
*Assistant Examiner*—Kimnhung Nguyen
(74) *Attorney, Agent, or Firm*—Frishauf, Holtz, Goodman & Chick, P.C.

(57) ABSTRACT

A display apparatus is provided with a display member which is printed in gradations of color from a first color to a second color from one side of the member to other side, and an electro-optical display device having plural dot display sections disposed on the display member. The plural dot display sections are selectively driven, to display characters, images, etc. in gradations of color. The display apparatus which is simple in structure and low in manufacturing cost advantages to improve image and/or character discrimination and is used for an adornment purpose.

25 Claims, 11 Drawing Sheets

DISPLAY APPARATUS AND ELECTRONIC WATCH USING THE DISPLAY APPARATUS

BACKGROUND OF THE INVENTION

1. Field of the Invention

The present invention relates to a display apparatus for displaying characters and images in gradations of color and an electronic watch using such display apparatus.

2. Description of the Related Art

As disclosed in Japanese laid-open patent publication No. hei8-220263 and Japanese laid-open patent publication No. sho57-101788, an electronic watch has been proposed, which uses a dot matrix display apparatus for the purposes of improving image and/or character discrimination and for an ornament purpose.

In a conventional electronic wrist watch, a monochrome liquid crystal display device is used to display characters and images. Therefore, such electronic watch is monotonous in design and poor in ornament, and has a problem to be solved in character discrimination. A color liquid crystal display device used in the electronic watch will improve character discrimination and may be used by way of ornament to the electronic watch, but has another problems that such watch will be expensive and the display device will consume much more power, resulting in a short battery life.

SUMMARY OF THE INVENTION

The present invention has been made to solve the conventional problems set forth above, and has an object to provide a display apparatus which is inexpensive and simple in structure, and further will improve character and/or image discrimination or may be used for the ornament purpose, and further object to provide an electronic watch using such display apparatus.

According to one aspect of the invention, there is provided a display apparatus which comprises a display member printed in gradations of color from a first color to a second color from one side of the member to other side, an electro-optical display device having plural dot display sections disposed on the display member, each capable of allowing the light to transmit through and preventing the light from transmitting through, and a driving circuit for selectively driving the plural dot display sections of the electro-optical display device to display data such as characters, images, etc. in gradations of color.

The display apparatus of the present invention which is inexpensive and simple in structure will display characters and/or images in gradations of color to improve character and/or image discrimination and may be used by way of ornament to other apparatuses.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles and the scope of the invention.

DETAILED DESCRIPTION OF THE PREFERRED EMBODIMENTS

Figure 1:
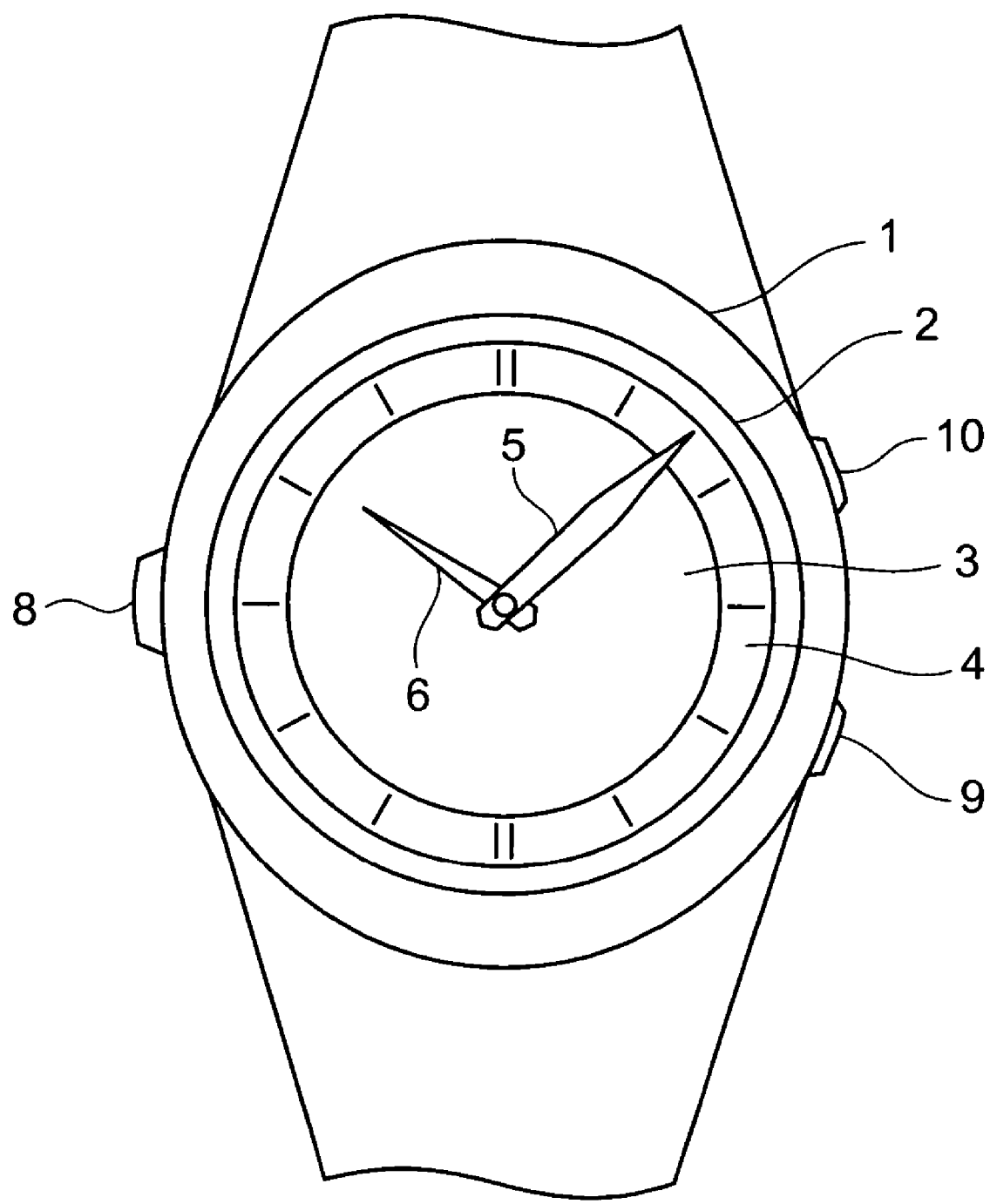
FIG. 1 is an external plane view of an electronic watch according to a first embodiment of the invention.

Preferred embodiments of the present invention will be described with reference to the accompanying drawings. FIG. 1 is an external plane view of an electronic watch (hereafter, an electronic wrist watch) according to one embodiment of the invention. A round watch casing 1 has a watch glass 2 fixed thereon, a liquid crystal display device 3 under the watch glass 2, and a minute hand 5 and a hour hand 6, both rotatably supported by an axis penetrating through the liquid crystal display device 3 at the center. Further, there is provided a ring shaped hour plate 4 around the peripheral of the liquid crystal display device 3, on which plate hour graduation is printed. On the peripheral surface of the watch casing 1, there are provided a light key 8, a mode switching key 9 for switching an operation mode of the electronic watch, and a city selecting key 10. The light key 8 is manipulated to turn on or off an EL (electroluminescence) element 7 (shown in FIG. 3), which illuminates the liquid crystal display device 3 from the inside of the device. The city selecting key 10 is used to chose a city in a world time display mode of the electronic watch.

Figure 2:
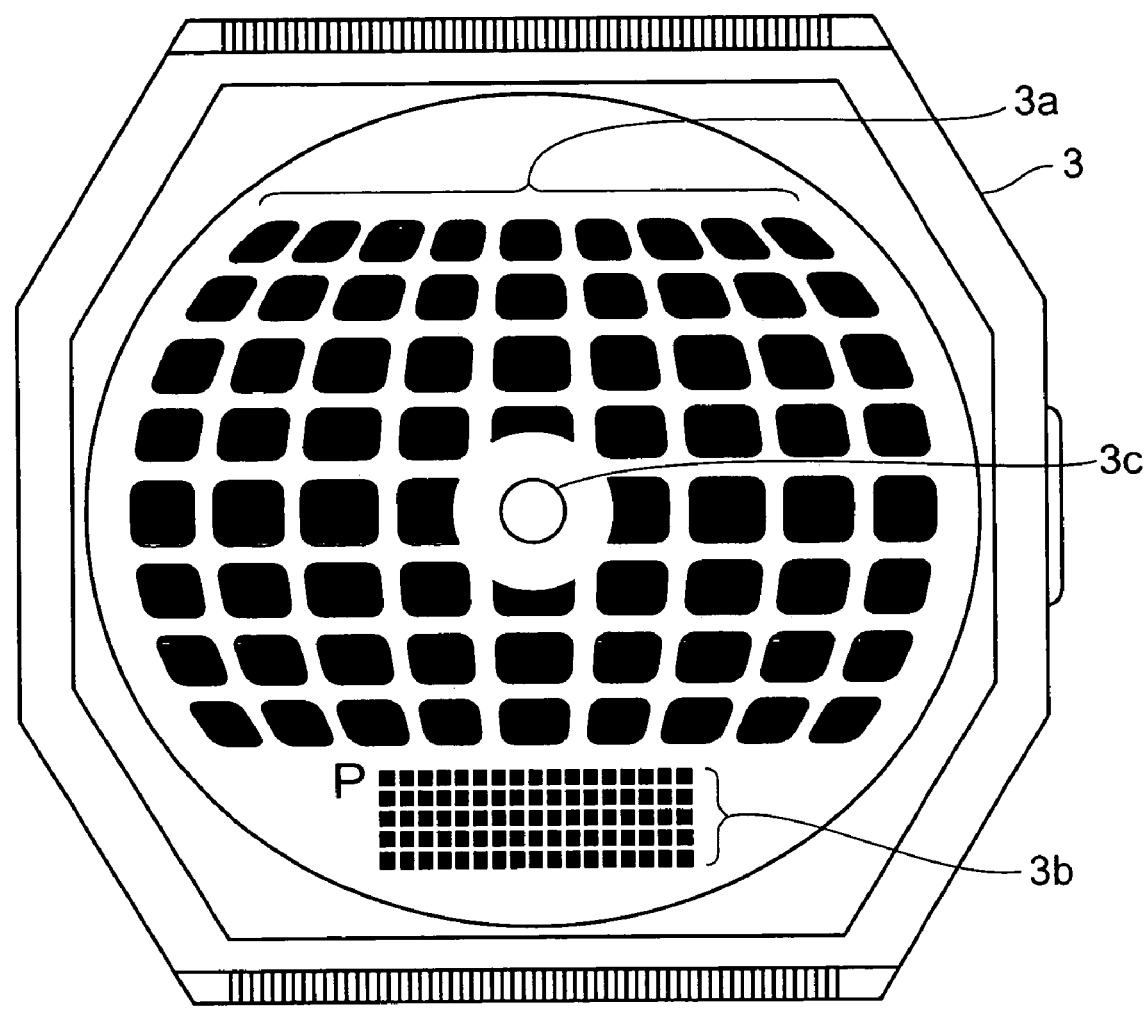
FIG. 2 is a plane view illustrating a display surface of the electronic watch shown in FIG. 1.

FIG. 2 is a plane view illustrating the liquid crystal display device 3 in detail. The liquid crystal display device 3 is provided with a gradation display portion 3a in its center part and a data display portion 3b at its bottom part, as seen in FIG. 2.

The liquid crystal display device 3 is formed with a through hole 3c at the center, through which hole the axis for supporting the minute and hour hands 5, 6 is inserted. There are disposed plural dot display elements in a 9×8 matrix arrangement on the gradation display portion 3a excluding the center portion (which corresponds to one dot display element) where the through hole 3c is formed. The dot display elements disposed at the upper and the bottom portions of the gradation display portion 3a (as seen in the drawing) are smallest in shape, and those disposed around the center portion are large in shape. The four dot display elements disposed around the through hole 3c are of a shape with a part removed.

Figure 3:
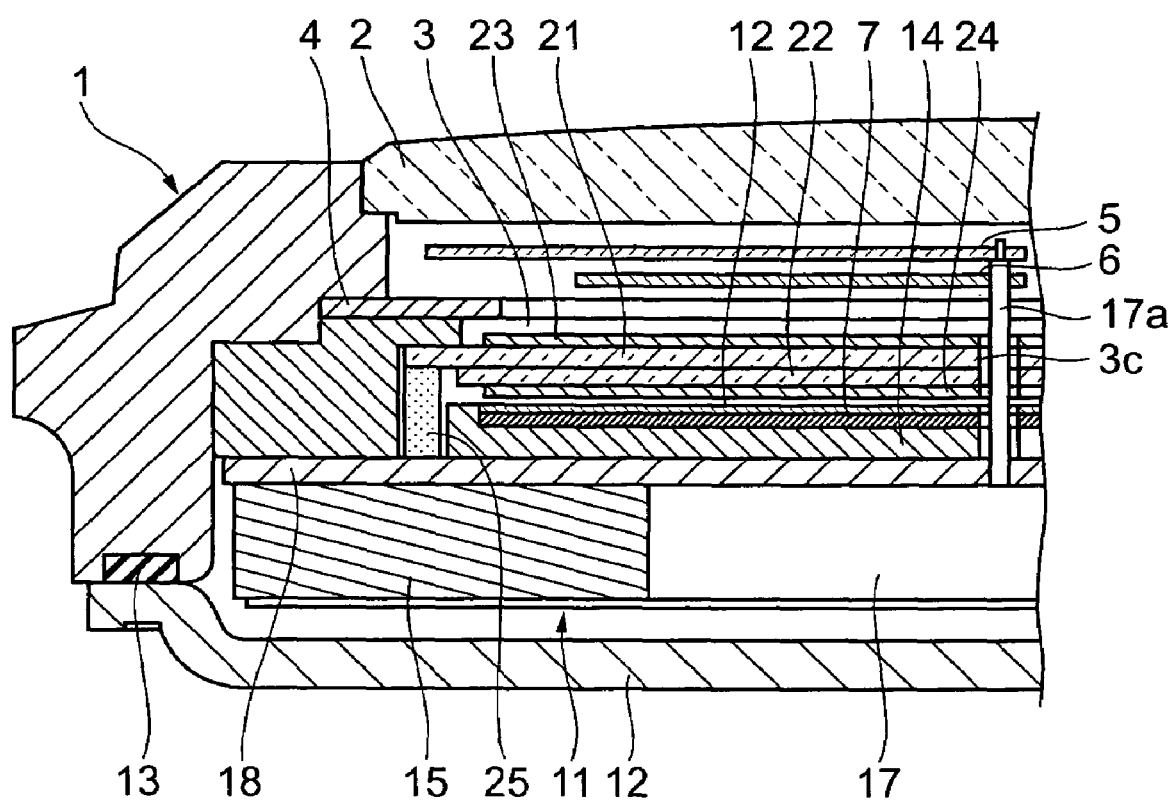
FIG. 3 is an enlarged cross sectional view illustrating a main portion of a display device mounted in the electronic watch of FIG. 1.
Figure 4:
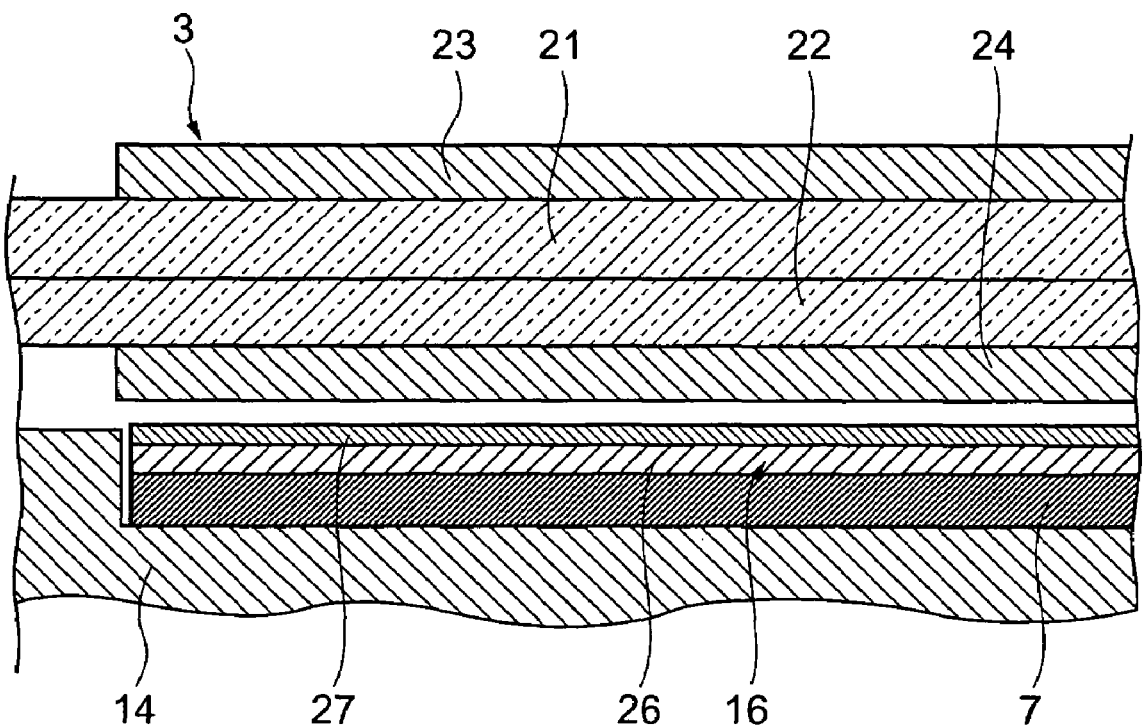
FIG. 4 is an enlarged cross sectional view showing the main portion of the display device shown in FIG. 3.

FIG. 3 is an enlarged cross sectional view illustrating the main portion of the electronic wrist watch and FIG. 4 is an enlarged cross sectional view showing the main portion of the liquid crystal display device. As shown in FIG. 3, the electronic wrist watch holds a time counting module 11 in the watch casing 1. A bottom cover 12 is attached to the bottom portion of the watch casing 1 through a waterproof ring 13.

The time counting module 11 has an analog function and a digital function, and is provided with an upper housing 14 of synthetic resign and a lower housing 15 of synthetic resin. The liquid crystal display device 3, a multi-color display member 16 and EL element 7 are stacked on and received within the upper housing 14. An analog movement 17 is received in the lower housing 15. A circuit board 18 is disposed between the upper housing 14 and the lower housing 15. On the circuit board 18 is mounted an electronic circuit for driving the liquid crystal display device 3. The liquid crystal display device 3 and the analog movement 17 are electrically connected to the circuit board 18. A hand axis 17a studded in an upper surface of the analog movement 17 penetrates through the through hole 3c formed in the liquid crystal display device 3 appearing from an upper surface of display device 3. On an edge portion of the hand axis 17a are fixed the minute hand 5 and the hour hand 6.

As shown in FIG. 3 and FIG. 4, the liquid crystal display 3, the multi color display member 16, the EL element 7 are put together in a stack. The liquid crystal display 3 is of a negative type, and consists of a pair of transparent electrode substrates 21, 22, liquid crystal (not shown) enclosed between these electrode substrates 21, 22 and polarizing plates 23, 24 stacked respectively on an upper surface of the electrode substrate 21 and a bottom surface of the electrode substrate 22. When a voltage is selectively applied between the pair of electrode substrates 21, 22, portions of electrode substrates 21, 22 where the voltage is applied and portions of the polarizing plates 23, 24 where correspond to the portions of the electrode substrates 21, 22 turn to allow the light to transmit through to electro-optically display information such as a time.

In the liquid crystal display device 3, when no voltage is applied between the pair of electrode substrates 21, 22, liquid crystal molecules enclosed between the electrode substrates 21, 22 keep a constant twist orientation so that the light transmitted through the upper polarizing plate 23 is twisted by the twist orientation of the liquid crystal molecules. The twisted light is blocked by the lower polarizing plate 24. Meanwhile, when a voltage is applied between the pair of electrode substrates 21, 22, liquid crystal molecules enclosed between portions of the electrodes substrates 21, 22 where the voltage is applied to change in the twist orientation so that the light transmitted through the upper polarizing plate 23 is not twisted by the liquid crystal molecules. The light which is not-twisted is allowed to transmit through the lower polarizing plate 24.

The liquid crystal display device 3 displays information such as a time with the transmitted light and the blocked light. The upper electrode substrate 21 of the pair of electrode substrates 21, 22 is provided with segment electrodes and the lower electrode substrate 22 is provided with a common electrode. These segment electrodes and common electrode have connecting wires (not shown) which are guided on a lower surface of the upper electrode substrate 21 to an edge portion thereof to be electrically connected with a connecting terminal portion.

As shown in FIG. 3, the connecting terminal portion of the upper electrode substrate 21 is supported by an inter-connector 25 fixed on the circuit board 18 and at the same time is electrically connected to the circuit board 18 through the inter-connector 25.

The multi-color display member 16 is provided on an upper surface of EL element 7, facing the lower surface of the liquid crystal display device 3, as shown in FIG. 4. The multi-color display member 16 consists of a white-tinged film 26 of semi-transmission and reflecting nature, and a multi-ink membrane 27 of light-transmission nature, which is provided on the film 26 to covers the whole surface of the film 26 which faces the liquid crystal device 3. Receiving the light, the white-tinged film 26 allows a part of the received light to transmit as white light and reflects other part of the received light as white light. Ink of light-transmission nature is printed or coated throughout the whole upper surface of the white-tinged film 26 to form the multi-ink membrane 27, as shown in FIG. 4. A portion of the multi-ink member 27 beneath the gradation display portion 3a is colored in blue at a twelve o'clock side, in red at a six o'clock side, and in purple at a center. The colored portion of the multi-ink member 27 from the twelve o'clock side to the center changes gradually in color from blue to purple, and the colored portion of the multi-ink member 27 from the center to the six o'clock side changes gradually in color from purple to red. As described, the colored portion of the multi-ink member 27 beneath the gradation display portion 3a changes gradually in color on the twelve o'clock and six o'clock portions and is colored in the same color on the three o'clock and nine o'clock portions. A portion of the multi-color member 27 beneath the data display portion 3b is colored in white.

EL element 7 consists of light emitting elements of a flat type, and is disposed on the upper housing 14, facing the lower surface of the liquid crystal display device 3, as shown in FIG. 4. EL element 7 consists of an upper transparent electrode substrate, a lower electrode substrate, and an electroluminescence layer (EL Layer) disposed between these electrode substrates. When a voltage is applied between the upper and lower electrode substrates, EL layer emits light and illuminates the liquid crystal display device 3 uniformly from beneath through the upper transparent electrode substrate. The lower electrode substrate is made of a metal or is coated with a reflecting layer to reflect the light emitted from EL layer.

In the electronic wrist watch of the structure set forth above, when a voltage is selectively applied between the pair of electrode substrates 21, 22 of the liquid crystal display device 3, the twist orientation of the liquid crystal molecules to which the voltage is applied changes. The portion liquid crystal display device 3 where the twist orientation of the liquid crystal molecules changes and the portions of the polarizing plates 23, 24 where correspond to the portions of the above liquid crystal display device 3 turn to allow the light to transmit through. The light incoming through either of the upper and the lower polarizing plates 23, 24 transmits through the pair of electrode substrates 21, 22 and the liquid crystal, and outgoes through the other of the upper and the lower polarizing plates 23, 24 to electro-optically display information such as a time. In the light, since the external light comes in the watch casing 1 through the watch glass 2 to illuminate the liquid crystal display device 3, a user can read information displayed on the liquid crystal display device 3 without illumination from EL element 7.

When a voltage is applied between the pair of electrode substrates 21, 22, the external light incoming into the watch casing 1 transmits through the upper polarizing plate 23, the upper transparent electrode substrates 21, the liquid crystal display portion where the voltage is applied to allow the light to transmit, the lower transparent electrode substrates 22, and the lower polarizing plates 24 to be radiated onto the multi-color display member 16. While the external light radiated onto the multi-color display member 16 passes through the multi-ink portion 27, certain wave length components of the external light are selected depending on the colors of the multi-ink portion 27 to color the external light. A part of the colored light is reflected toward the liquid crystal display device 3 and meanwhile the other part of the colored light passes through the multi-color ink portion 27 and reflected on the white-tinged film 26. The reflected light passes through the multi-ink portion 27 again toward the liquid crystal display device 3. The colored light passes through the liquid crystal display device 3 from beneath to the upper surface of the device 3, and therefore information displayed on the device 3 can be seen in gradations of color through the watch glass 2.

Figure 5:
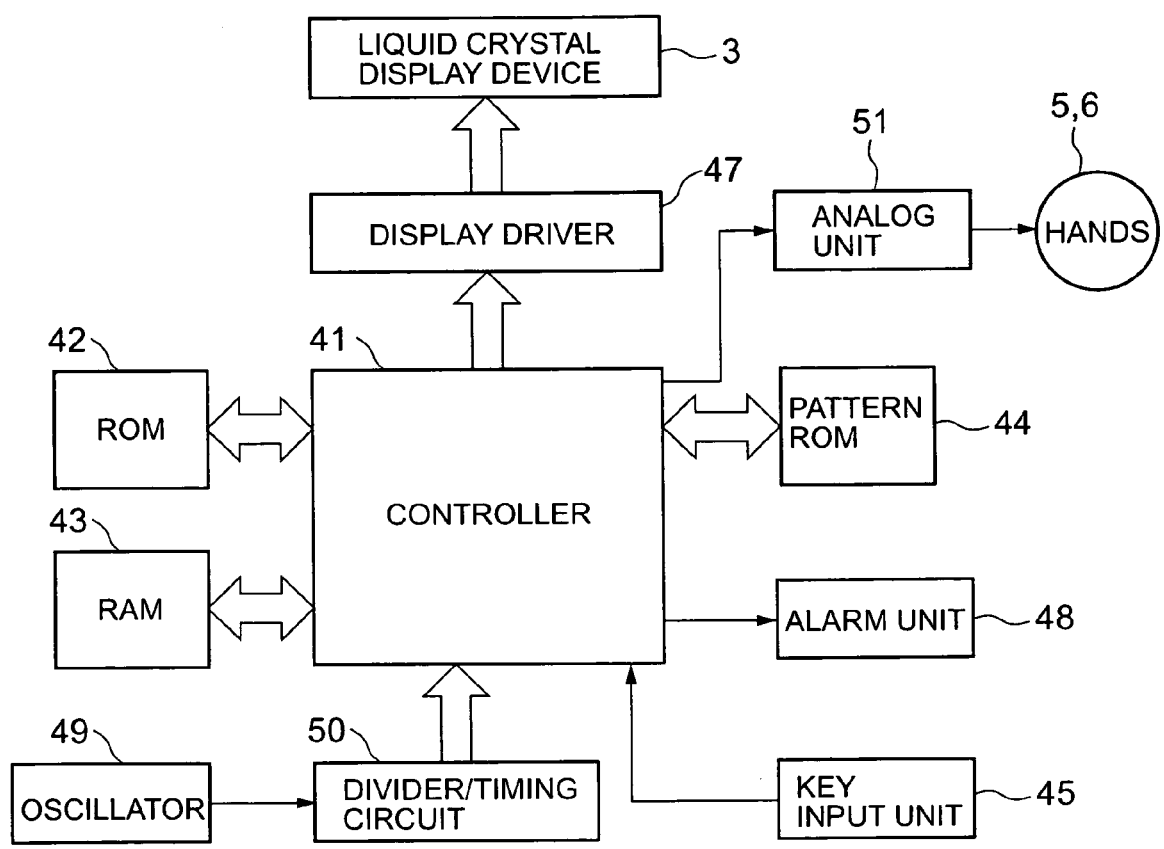
FIG. 5 is a block diagram showing a circuit configuration of the electronic watch shown in FIG. 1.

FIG. 5 is a block diagram showing a circuit configuration of a control system included in the electronic wrist watch shown in FIG. 1. The control system comprises the following elements, that is, a controller 41 including CPU for controlling whole operation of the electronic wrist watch, including a display operation; ROM 42 for storing programs and data executed or used by CPU; RAM 43 for storing data necessary for operation of CPU; a pattern ROM 44 for storing display and character pattern data; a key input unit 45 having plural keys to be manipulated for entering various data; a liquid crystal display device 46 for displaying characters and drawings; a display driver 47 for driving the liquid crystal display device 46; an alarm unit 48 for generating alarms, using, for instance, a beep sound; an oscillator 49 for generating a signal of a certain frequency; a divider/timing circuit 50 for dividing the signal generated by the oscillator to generate and supply signals of 1 Hz, 4 Hz and 8 Hz to control the controller 41; and an analog unit 51 for driving the minute hand 5 and the hour hand 6.

Figure 6:
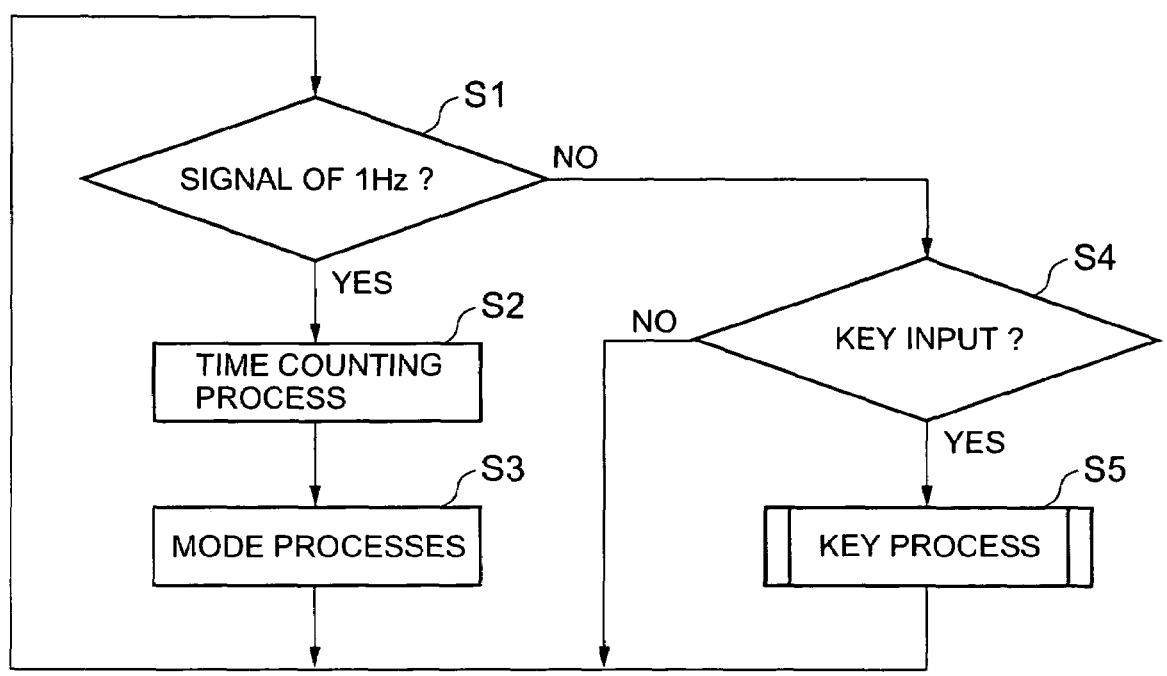
FIG. 6 is a flowchart of an operation procedure of the electronic watch shown in FIG. 1.

Now, operation of the electronic wrist watch according to the embodiment of the invention with reference to the flow chart of FIG. 6. In the electronic wrist watch in a standby state, the controller 41 judges at step S1 whether or not the signal of 1 Hz has been entered from the divider/timing circuit 50.

When it is determined at step S1 that the signal of 1 Hz has been entered, the controller 41 advances to step S2, where "1 sec." is added to time information stored on RAM 43 to update current time information, and a driving signal is supplied to the analog unit 51 every 20 second to drive the minute hand 5 by one step. The minute hand 5 is driven every 20 seconds by one step, and the hour hand 6 connected with the minute hand 5 through a series of gears rotates in association with rotation of the minute hand 5.

At step S3, processes in a basic time counting and displaying mode, an alarm displaying mode, an address displaying mode and a world time displaying mode are performed, and the controller 41 returns to step S1.

When it is determined at step S1 that the signal of 1 Hz has not been entered, the controller 41 advances to step S4, where it is judged whether or not the key input unit 45 is manipulated or any key input is entered. When the key input unit 45 is not manipulated or no key input is entered, the controller 41 returns to step S1. When the key input unit 45 is manipulated or a key input is entered, the controller 41 performs a key process corresponding to the key input, and then returns to step S1.

Figure 7:
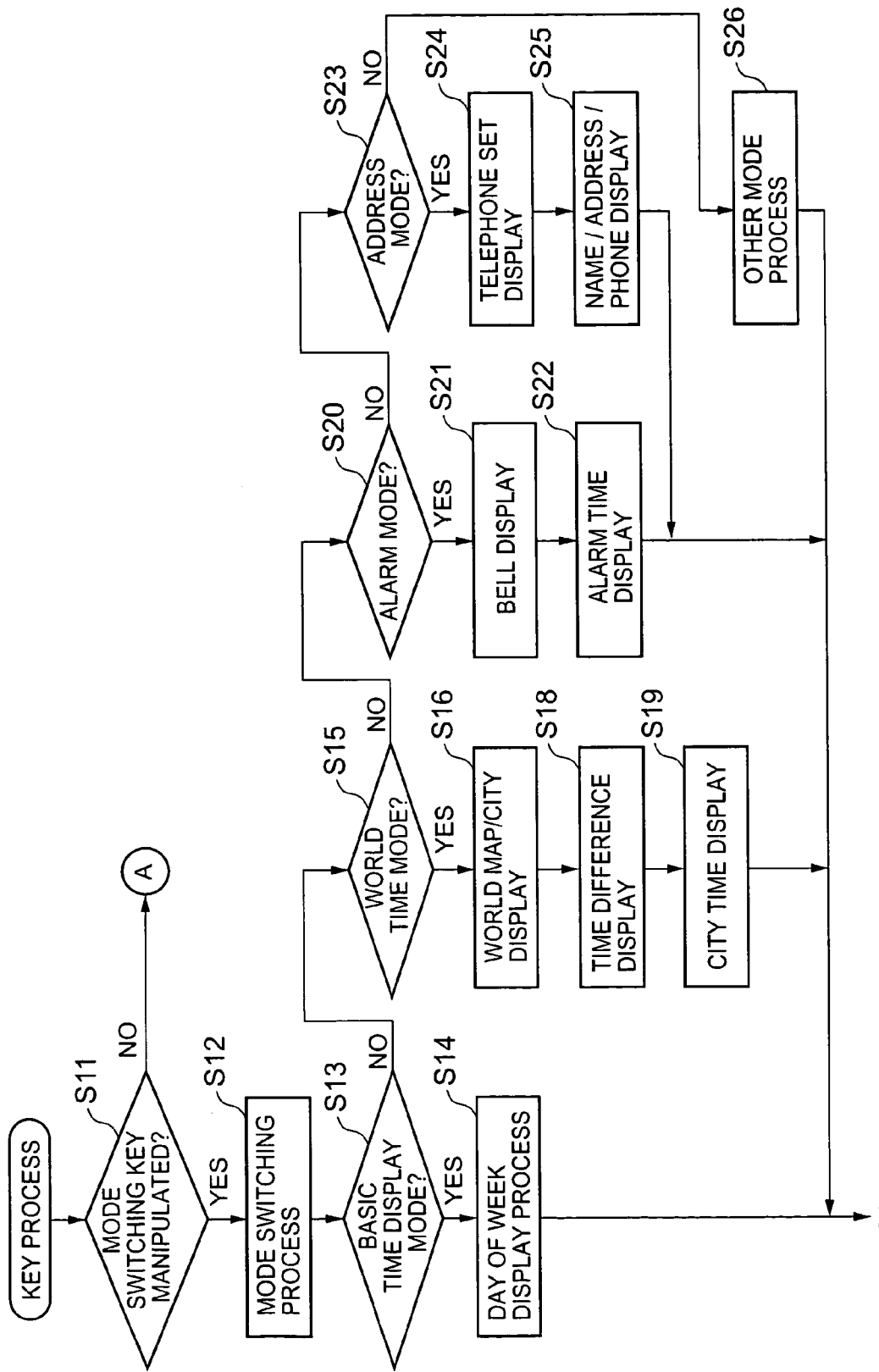
FIG. 7 is a flow chart representing a detailed procedure of a key process of FIG. 6.

FIG. 7 is a flow chart representing a detailed procedure of the key process at step S5 of FIG. 6. The controller 41 judges at step S11 whether or not the mode switching key 9 has been manipulated. When the mode switching key 9 has been manipulated, the controller 41 advances to step S12 to perform a mode switching process. When the mode switching key 9 is not manipulated, the controller 41 advances to step S27 of FIG. 8.

In the mode switching process, the controller 41 judges at step S13 whether a basic time counting and displaying mode has been set or not. When the basic time counting and displaying mode has been set, the controller 41 advances to step S14 to perform a day of the week displaying process. Thereafter, the controller 41 returns to step S1 of FIG. 6 again.

When it is determined at step S13 that the basic time counting and displaying mode has not been set, the controller 41 advances to step S15 to judge whether a world time displaying mode has been set or not. When the world time displaying mode has been set, the controller 41 advances to step S16 to display a moving image of the world map on the gradation display portion 3_a_ for a predetermined time duration and at the same time to display a city name selected by manipulation of the city selecting key 10 on the data display portion 46 for a predetermined time duration.

Figure 9:
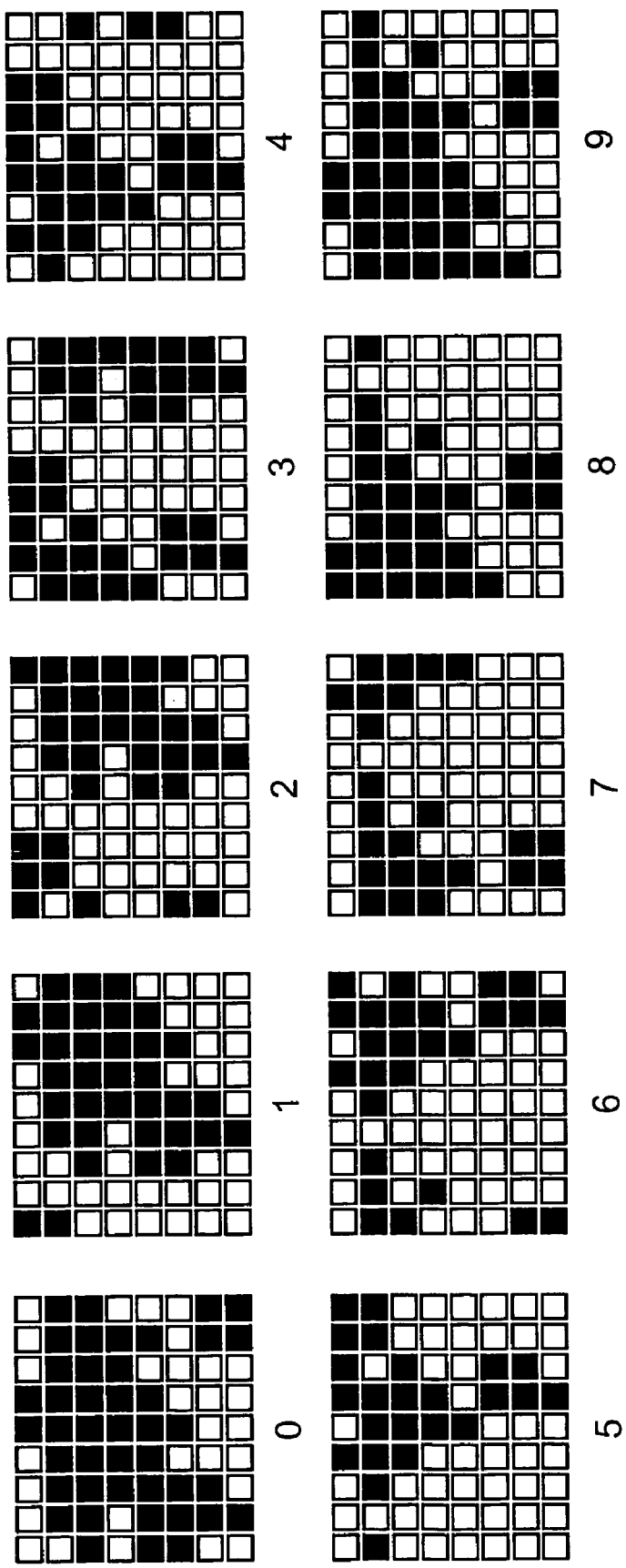
FIG. 9 is view illustrating by way of example world maps displayed on the display device of FIG. 2 every a certain time.
Figure 10:
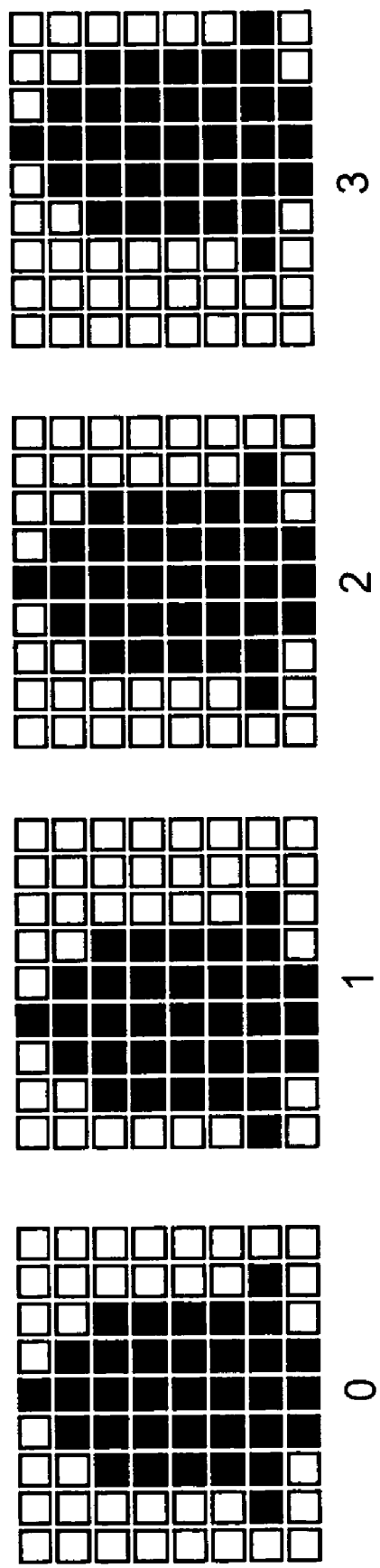
FIG. 10 is view illustrating by way of example images of a bell displayed on the display device of FIG. 2 every a certain time.

FIG. 9 is a view illustrating a sample of the moving image of the world map. Images of the world map 0 through 9 are successively displayed in synchronization with a signal of 8 Hz, such that the world map can be seen as if it rotates. Display patterns of the world map are supplied to the display driver 52 from the pattern ROM 44, and are successively displayed on the gradation display portion 3_a_ of the liquid crystal display device 3.

After the predetermined time duration has lapsed, the controller 41 advances to step S18 to display a time difference between Greenwich and the city selected and displayed on the gradation display portion 3_a_. Thereafter, the controller 41 goes to step S19 to display a time at the city selected and displayed on the gradation display portion 3_a_. Then, the controller 41 returns to step S1 of FIG. 6.

When it is determined at step S15 that the world time displaying mode has been set, the controller 41 advances to step S20 to judge whether an alarm display mode has been set or not. When the alarm display mode has been set, the controller 41 advances to step S21, where four images of a bell shown in FIG. 4. are successively displayed on the gradation display portion 3_a_ of the liquid crystal display device 3 in synchronization with a signal of 4 Hz, such that the bell can be seen as if it swings. At step S22, an alarm time is read out from RAM 43 and displayed on the data display portion 3_b_ of the liquid crystal display device 3. Thereafter, the controller 41 returns to step S1 of FIG. 6.

When it is determined at step S20 that the alarm display mode has not been set, the controller 41 advances to step S23 to judge whether an address display mode has been set. When the address display mode has been set, the controller 41 advances to step S24 to display an image of a telephone set on the display device 3. At step S25 the controller 41 displays a name, an address, a phone number stored on RAM 43 on the display device 46 and then returns to step S1 of FIG. 6. When it is determined at step S23 that the address display mode has not been set, the controller 41 goes to step S26 to perform other process. Thereafter, the controller 41 returns to step S1 of FIG. 6.

Figure 8:
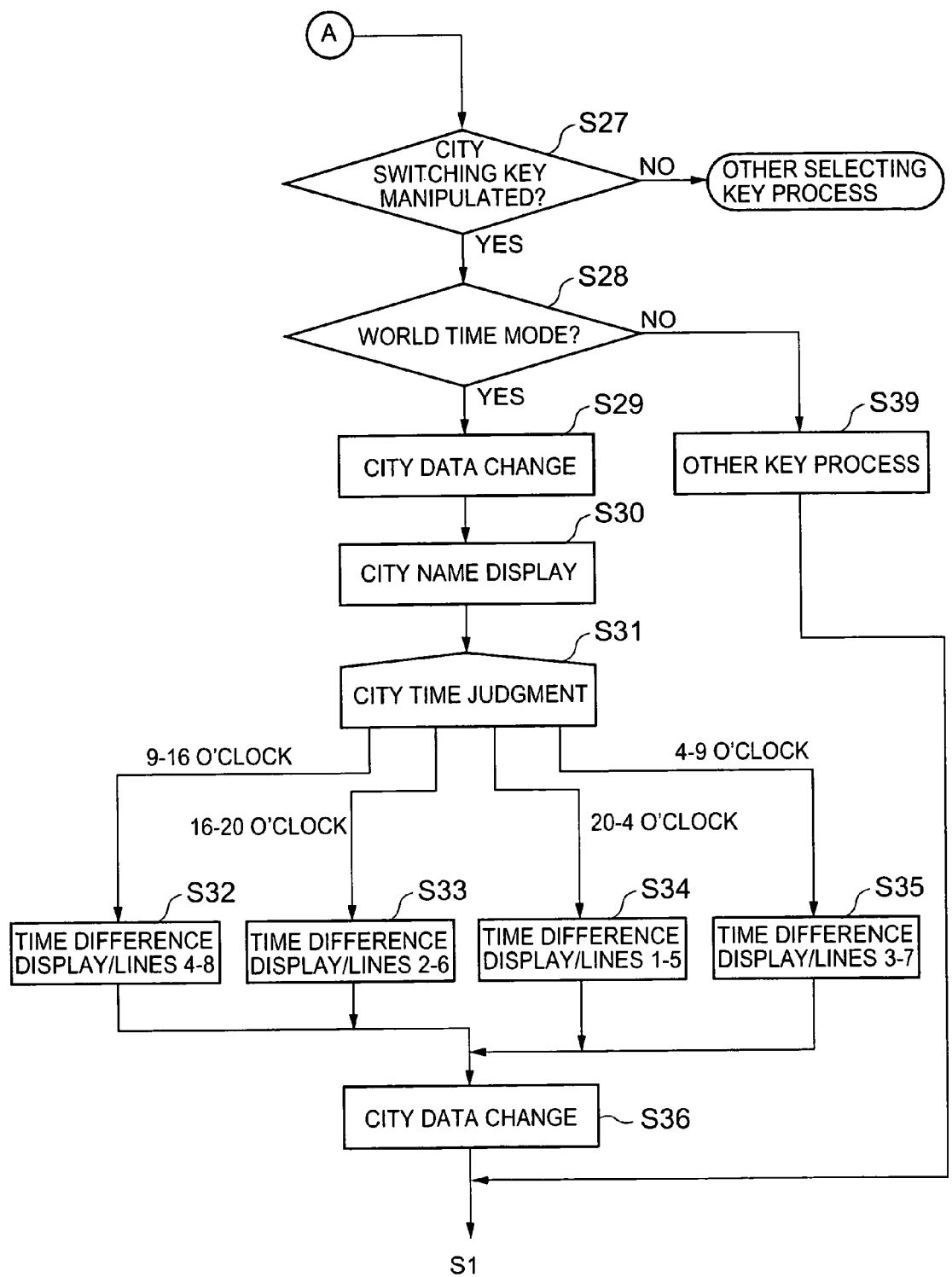
FIG. 8 is a flowchart showing a time-difference display process to be performed in the world time display mode.

FIG. 8 is a flow chart showing a time-difference display process in the world time display mode. When it is determined at step S11 of FIG. 7 that the mode switching key 9 is not manipulated, the controller advances to step S27 of FIG. 8 to judge whether the city selecting key 10 has been manipulated or not. When the city selecting key 10 has not been manipulated, the controller judges whether other selecting key is manipulated. When the city selecting key 10 has been manipulated, the controller advances to step S28.

At step S28, the controller 41 judges whether the world time display mode has been set or not. When the world time display mode has not been set, the controller 41 performs other key process. When the world time display mode has been set, the controller 41 advances to step S29 to change city data. At step S30, the controller 41 displays a name of a city changed at step S29 on the data displaying portion 3*b*. At step S31, the controller 41 determines a current time at the changed city and calculates a time difference between Greenwich time and the current time.

Figure 11A:
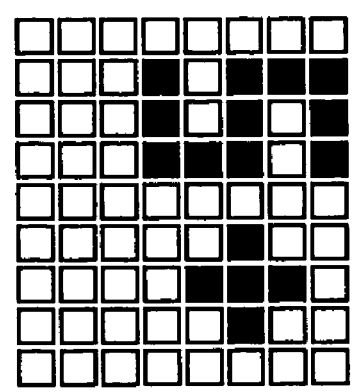
FIGS. 11A through 11D are views illustrating by way of example time differences displayed on the display device of FIG. 2.
Figure 11B:
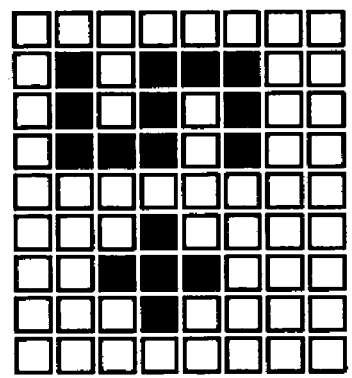
Figure 11C:
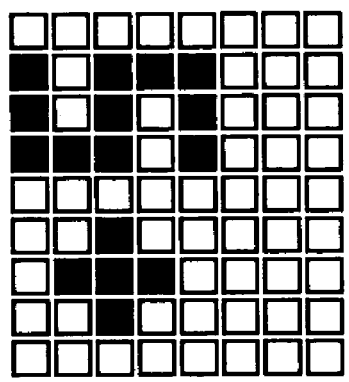
Figure 11D:
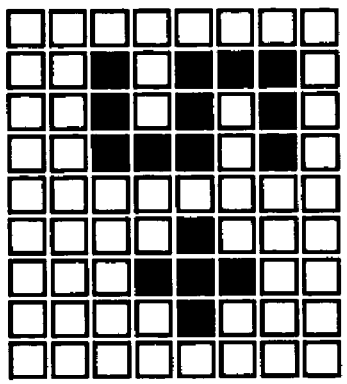

When it is determined that the current time at the city whose name is displayed at step S30 falls within a range between 9 o'clock and 16 o'clock (daytime), a time difference (+5) is displayed on the gradation display portion 3*a* (lines 4-8) at step S32 as shown in FIG. 11A. When it is determined that the current time at the city falls within a range between 16 o'clock and 20 o'clock (evening), a time difference (+5) is displayed on the gradation display portion 3*a* (lines 2-6) at step S33 as shown in FIG. 11B. When it is determined that the current time at the city falls within a range between 20 o'clock and 4 o'clock (night), a time difference (+5) is displayed on the gradation display portion 3*a* (lines 1-5) at step S34 as shown in FIG. 11C. When it is determined that the current time at the city falls within a range between 4 o'clock and 9 o'clock (morning), a time difference (+5) is displayed on the gradation display portion 3*a* (lines 3-7) at step S34 as shown in FIG. 11D. Thereafter the controller 41 advances to step S36 to change city data, and returns to step S1 of FIG. 6.

The time differences will be described, which are displayed on the display device 3 as shown in FIGS. 11A through 11D. In FIG. 11A, the time difference is displayed on the lowest part of the gradation display portion 3*a* (as seen in the drawing), and a numeral contained in time difference data is displayed in gradations of color from red to purple and a symbol of "+" contained in the time difference data is displayed in gradations of color of red. In FIG. 11B, the time difference is displayed on the upper part of the gradation display portion 3*a* (as seen in the drawing), and the numeral contained in the time difference data is displayed in gradations of color from purple to blue and the symbol of "+" contained in the time difference data is displayed in gradations of color of purple with a tinge of blue. In FIG. 11C, the time difference is displayed on the highest part of the gradation display portion 3*a* (as seen in the drawing), and the numeral contained in time difference data is displayed in gradations of color from blue to purple and the symbol of "+" contained in the time difference data is displayed in gradations of color of blue. In FIG. 11D, the time difference is displayed on the lower part of the gradation display portion 3*a* (as seen in the drawing), and the numeral contained in time difference data is displayed in gradations of color from purple to red and the symbol of "+" contained in the time difference data is displayed in gradations of color of purple with a tinge of red.

In the electronic wrist watch according to the embodiment of the invention, the display device 3 occupies most of a display area 30 of the wrist watch and therefore indications such as the world map, the image of a bell, and the alarm time displayed on the display device 30 can be seen from away. In particular, it can be instantly confirmed from the position and the color in which the data are displayed, whether or not the time differences displayed in the world time display mode is for the city that the user has in mind or whether it is the daytime or nighttime. The display system according to the embodiment allows to improve image discrimination of the display device and a design of the wrist watch. Further, the display device 3 can be manufactured at a reasonable low cost compared with a conventional color liquid crystal display device. An electronic wrist watch which has advantages set forth above may be produced without requiring an unreasonable high cost.

Further modification and variation can be made to the disclosed embodiments without departing from the subject and spirit of the invention as defined in the following claims. Such modification and variations, as included within the scope of these claims, are meant to be considered part of the invention as described. For example, in the embodiment set forth above the color in which the time differences are displayed varies depending on the current time, but the display device may be modified such that a picture or an animation on which the time differences are displayed in an over lapping manner varies depending on the current time. The display device of the invention may be applied to an electronic apparatus other than the electronic watch to display characters, images, etc. in gradations of color at a low cost, and further to improve its image discrimination and a design of the apparatus.

What is claimed is:

1. A display apparatus comprising:
   a display member printed in gradations of color from a first color to a second color from a first side of the display member to a second side of the display member;
   an electro-optical display device having plural dot display sections disposed on the display member, each capable of allowing light to transmit through and preventing light from transmitting through;
   a driving circuit for selectively driving the plural dot display sections of the electro-optical display device to display data in gradations of color;
   an analog movement with a hand axis disposed beneath the display member; and
   a minute hand and an hour hand;
   wherein the electro-optical display device and the display member are each formed with a through hole;
   wherein the hand axis of the analog movement penetrates through the through holes formed in the electro-optical display device and the display member, and includes a projecting part which protects out of the electro-optical display device; and
   wherein the minute and hour hands are fixed to the projecting part of the hand axis of the analog movement.

2. The display apparatus according to claim 1, wherein the electro-optical display device is a liquid crystal display device.

3. The display apparatus according to claim 2, wherein the liquid crystal display device comprises:
   a pair of electrode substrates;
   liquid crystal molecules of a twist orientation enclosed between the pair of electrode substrates; and
   a pair of polarizing plates, wherein a first one of the pair of polarizing plates is disposed on an upper surface of a first one of the pair of electrode substrates, and a second one of the pair of polarizing plates is disposed on a bottom surface of a second one of the pair of electrode substrates, and wherein polarizing axes of the pair of polarizing plates are parallel to each other.

4. The display apparatus according to claim 1, further comprising:
a light emitting member disposed beneath the display member, wherein the display member is printed translucently in gradations of color.

5. The display apparatus according to claim 4, wherein the light emitting member is an electroluminescence panel.

6. The display apparatus according to claim 1, wherein the driving circuit selectively drives the plural dot display sections of the electro-optical display device to display an animation.

7. The display apparatus according to claim 1, further comprising:
a casing with watch stripes, wherein the electro-optical display device, the display member and the driving circuit are provided in the casing.

8. The display apparatus according to claim 1, further comprising:
a time counting circuit for counting current-time data;
wherein the electro-optical display device has a time displaying portion for displaying the current-time data counted by the time counting circuit.

9. An electronic watch provided with a display apparatus which comprises:
a display member having a first area and a second area at least partially different from the first area, and printed in gradations of color from a first color to a second color from a first side of the display member to a second side of the display member;
an electro-optical display device having plural dot display sections disposed on the display member, each capable of allowing light to transmit through and preventing light from transmitting through;
a time counting circuit for counting current-time data;
a driving circuit for driving the plural dot display sections disposed within an area corresponding to the first area of the display member to display data in gradations of color, when the current-time data counted by the time counting circuit is within a first period of time, and for driving the dot display sections disposed within an area corresponding to the second area of the display member to display data in gradations of color, when the current-time data counted by the time counting circuit is within a second period of time.

10. The electronic watch according to claim 9, further comprising:
a light emitting member disposed beneath the display member, wherein the display member is printed translucently in gradations of color.

11. The electronic watch according to claim 10, wherein the light emitting member is an electroluminescence panel.

12. The electronic watch according to claim 9, wherein the electro-optical display device is a liquid crystal display device.

13. The electronic watch according to claim 12,
wherein the liquid crystal display device comprises:
a pair of electrode substrates;
liquid crystal molecules of a twist orientation enclosed between the pair of electrode substrates; and
a pair of polarizing plates, wherein a first one of the pair of polarizing plates is disposed on an upper surface of a first one of the pair of electrode substrates, and a second one of the pair of polarizing plates is disposed on a bottom surface of a second one of the pair of electrode substrates, and wherein polarizing axes of the pair of polarizing plates are parallel to each other.

14. The electronic watch according to claim 9, further comprising:
an analog movement with a hand axis disposed beneath the display member; and
a minute hand and an hour hand;
wherein the electro-optical display device and the display member each are formed with a through hole;
wherein the hand axis of the analog movement penetrates through the through holes formed in the electro-optical display device and the display member, and includes a projecting part projecting out of the electro-optical display device; and
wherein the minute and hour hands are fixed to the projecting part of the hand axis of the analog movement.

15. The electronic watch according to claim 9, wherein the driving circuit selectively drives the plural dot display sections of the electro-optical display device to display an animation.

16. The electronic watch according to claim 9, further comprising:
a casing with watch stripes,
wherein the electro-optical display device, the display member and the driving circuit are provided in the casing.

17. The electronic watch according to claim 9,
wherein the plural dot display sections of the electro-optical display device are disposed substantially in an N×M matrix arrangement, wherein a shape of each of the plural dot display sections grows larger as a location of the dot display section on the electro-optical display device comes to a center from twelve o'clock and becomes smaller as the location of the dot display section on the electro-optical display device comes to six o'clock from the center, and wherein an area where all the plural dot display sections are disposed forms substantially a round pattern.

18. The electronic watch according to claim 9, wherein the electro-optical display device has a time displaying portion for displaying the current-time data counted by the time counting circuit.

19. A display apparatus comprising:
a display member printed in gradations of color from a first color to a second color from a first side of the display member to a second side of the display member;
an electro-optical display device having plural dot display sections disposed on the display member, each capable of allowing light to transmit through and preventing light from transmitting through; and
a driving circuit for selectively driving the plural dot display sections of the electro-optical display device to display data in gradations of color,
wherein the plural dot display sections of the electro-optical display device are disposed substantially in an N×M matrix arrangement, wherein a shape of each of the plural dot display sections grows larger as a location of the dot display section on the electro-optical display device comes to a center from twelve o'clock and becomes smaller as the location of the dot display section on the electro-optical display device comes to six o'clock from the center, and wherein an area where all the plural dot display sections are disposed forms substantially a round pattern.

20. The display apparatus according to claim 19, wherein the electro-optical display device is a liquid crystal display device.

21. The display apparatus according to claim 20, wherein the liquid crystal display device comprises:
   a pair of electrode substrates;
   liquid crystal molecules of a twist orientation enclosed between the pair of electrode substrates; and
   a pair of polarizing plates, wherein a first one of the pair of polarizing plates is disposed on an upper surface of a first one of the pair of electrode substrates, and a second one of the pair of polarizing plates is disposed on a bottom surface of a second one of the pair of electrode substrates, and wherein polarizing axes of the pair of polarizing plates are parallel to each other.

22. The display apparatus according to claim 19, further comprising:
   a light emitting member disposed beneath the display member, wherein the display member is printed translucently in gradations of color.

23. The display apparatus according to claim 19, wherein the driving circuit selectively drives the plural dot display sections of the electro-optical display device to display an animation.

24. The display apparatus according to claim 19, further comprising:
   a casing with watch stripes, wherein the electro-optical display device, the display member and the driving circuit are provided in the casing.

25. The display apparatus according to claim 19, further comprising:
   a time counting circuit for counting current-time data;
   wherein the electro-optical display device has a time displaying portion for displaying the current-time data counted by the time counting circuit.

* * * * *